(No Model.) 2 Sheets—Sheet 1.

E. WESTON.
JUNCTION DEVICE FOR ELECTRIC CIRCUITS.

No. 301,029. Patented June 24, 1884.

Attest:
Raymond E. Barnes
W. H. Doggett

Inventor:
Edward Weston
By Parker W. Page
Atty.

(No Model.)  2 Sheets—Sheet 2.
E. WESTON.
JUNCTION DEVICE FOR ELECTRIC CIRCUITS.
No. 301,029.  Patented June 24, 1884.
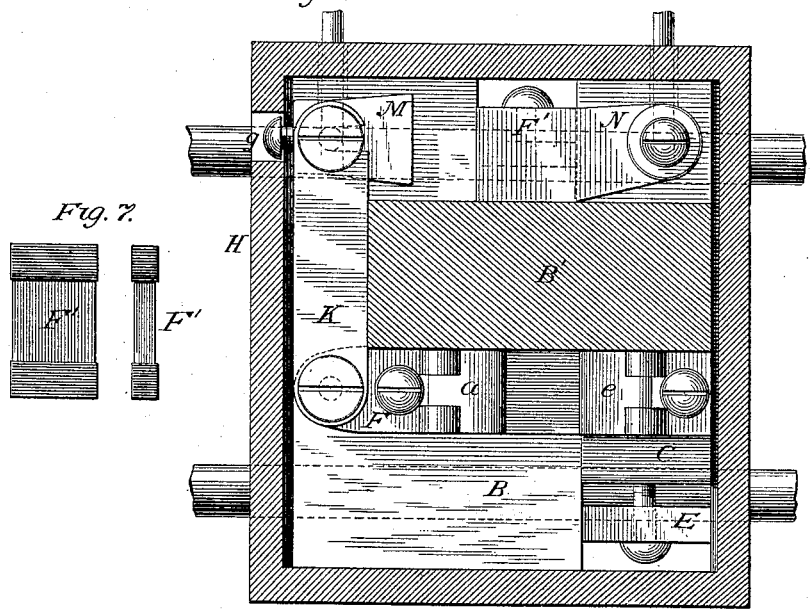
Fig. 4.
Fig. 7.
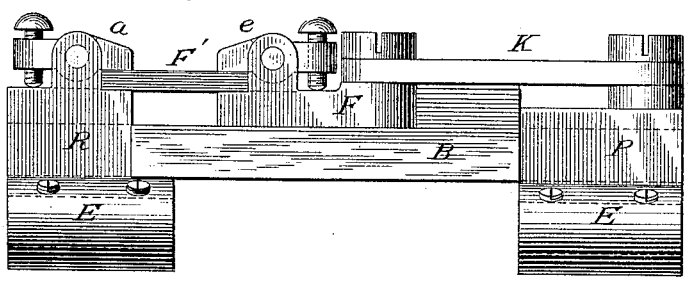
Fig. 5.
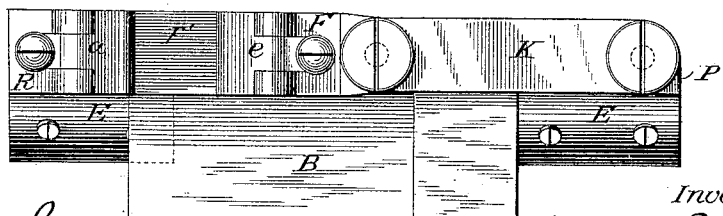
Fig. 6.
Attest:
Raymond F. Barnes.
W. H. Doggett.
Inventor:
Edward Weston
By Parker W. Page
atty.

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

JUNCTION DEVICE FOR ELECTRIC CIRCUITS.

SPECIFICATION forming part of Letters Patent No. 301,029, dated June 24, 1884.

Application filed January 12, 1884. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Connection or Junction Devices for Electric Circuits, of which the following is a specification.

In other applications filed by me I have shown and described a device for supporting electric conductors, consisting of a board or slat containing parallel grooves or channels in which the conductors are laid, and a second slat laid over the first for protecting and concealing the conductors. When branch circuits are to be run from these conductors, or a safety-strip connected with one of the same, I employ devices invented by me for making the requisite connections, which have been designated as "connection" or "junction" boxes. These contain two plates, blocks, or castings adapted to be applied to the outer slat or cover, and provided with parts that extend down into the grooves of the under slat and make connection with the conductors that are contained therein. The plates or castings are also provided with means for connecting them to other conductors, either directly or through a safety-strip or a circuit-breaker, or both combined.

My present invention comprises the devices and combinations which I have thus generally described.

For an understanding of the nature and purpose of the invention reference is made to the accompanying drawings.

Figure 1:
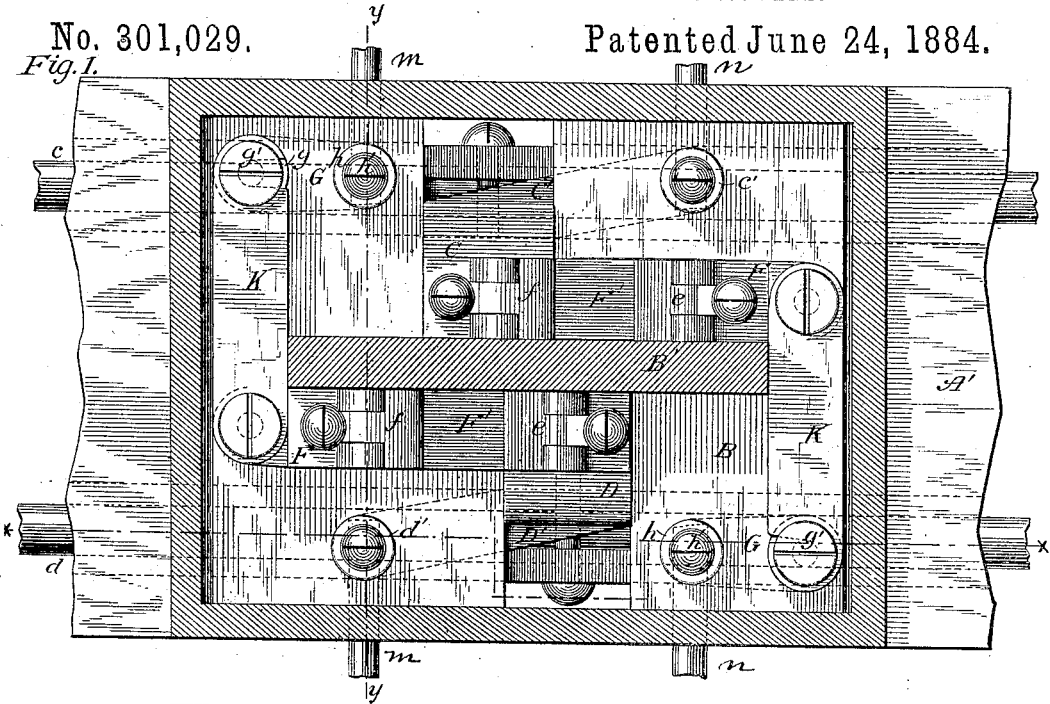
Figure 2:
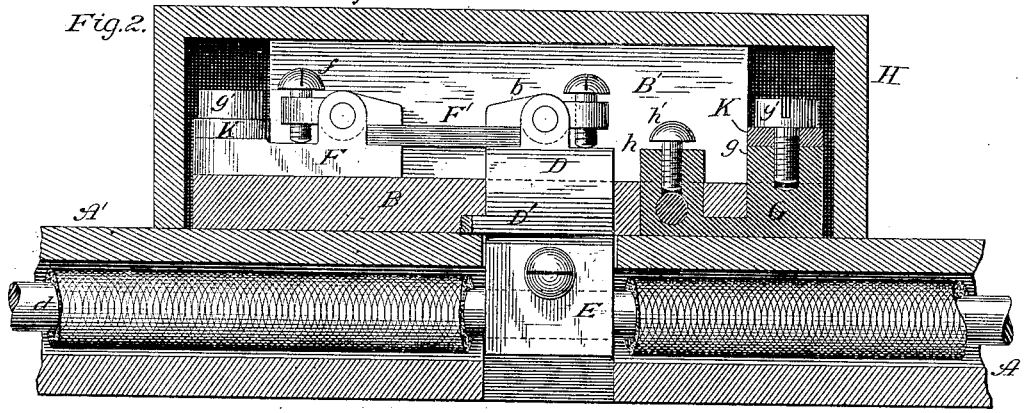
Figure 3:
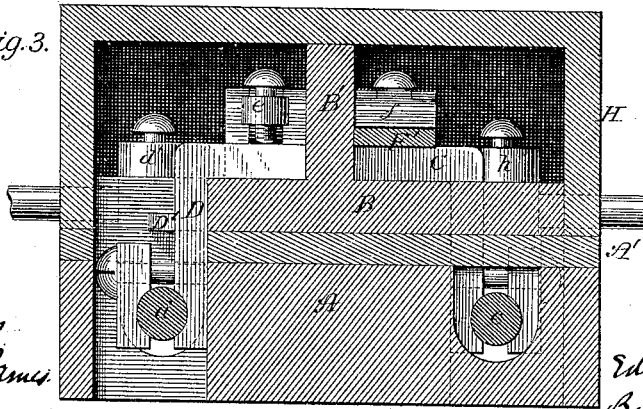

Figure 1 is a plan view of the invention as applied to the running of two branch circuits from one main line. Fig. 2 is a broken section of the same, on line $x\,x$ of Fig. 1. Fig. 3 is a section on line $y\,y$ of Fig. 1. Fig. 4 is a plan view of the invention as applied to the running of a single branch circuit from a main line. Fig. 5 is a side elevation of the device as constructed for connecting two parts of a circuit with a safety-strip. Fig. 6 is a top view of the same. Fig. 7 represents a safety-strip.

Referring to Figs. 1, 2, and 3, which, as above stated, illustrate the invention as embodied in a junction or connection box for running two branch circuits from one main line, A designates the grooved slat or holder, with the covering-slat A'. The upper slat, A', is cut away at two points, and upon the slat is placed a wooden or insulating block, B, with a raised part, B'.

On one side of the part B' is secured a casting, C, and on the opposite side a similar casting, D. These castings are of copper or brass, and are formed as plates or blocks, which are secured to the plate B, and have projecting down into the grooves any convenient form of clamp, E, or similar means for making connection with the conductors $c\,d$ in the grooves of slat A.

On the castings C D are mounted pivoted clamping-levers $a\,b$, with screws or like means for operating them.

F F are plates, of copper or brass, secured to the plate B. Upon them are mounted clamping-levers $e\,f$, similar to those upon the castings C D. Safety-strips F' are clamped by the jaws $a\,b\,e\,f$, and connect the plates F F with the castings C D, respectively.

G G are metal plates or blocks secured to the under side of plate B, and having two prominent portions, $g\,h$, that extend up through the plate. In the parts $g$ are clamping-screws $g'$, with which are arranged, to engage notched switch-levers K, pivoted to plates F. In the parts $h$ are recesses and clamping-screws $h'$, arranged for securing conductors to the plates or blocks G.

From the castings C D extend plates C' D' through or under the plate B. On the ends of these plates are screw-plates $c'\,d'$, extending up through plate B, and arranged for connection with conducting-wires. A box, H, is used as a cover to the parts described.

The method of applying and using this device is as follows: The slats A A' being cut away at the desired points, the block B is laid upon the upper slat, so that the clamps E extend down into the grooves in the lower slat. The clamps are then made fast to the conductors $c\,d$ and smaller conductors, $m\,m\,n\,n$, inserted in the posts $h\,c'\,d'$. These conductors are carried off in grooved slats or otherwise, and form branch circuits from the main line, as will be seen by tracing their electrical connections. In one side or conductor of each branch circuit is included a safety-strip and a circuit-breaker, so that only a certain amount of current can be drawn off by the branches, while the circuit in them may be closed or interrupted permanently or temporarily, at will.

In Fig. 4 the same principle of construction is followed in taking off a single branch. H is the box (shown in section) placed over the junction or connection devices, which are to be attached to a grooved slat or molding. B is the wooden or insulating block; C, a casting secured thereto, and provided with clamp E, extending down into the channel or groove and connected with one of the conductors. The casting C is connected with a plate, F, by a safety-strip, which is clamped by the jaws $a\ e$. A switch-lever, K, pivoted to plate F, connects the same with a casting, M, secured to the plate B, and containing a recess in which a conductor may be inserted and secured by means of the screw $g'$. N is a plate secured to plate or block B, and provided with a clamp, F', and means for connection with a conductor. This device is applied and used in the same manner as that first described. The plate B, with the metal plates or castings secured thereto, is applied to the slat containing the conductors. To these the parts C and N are connected by the clamp. Smaller conductors are then connected to the parts C and and N, to form the branch circuits. When a safety-strip is to be inserted in a line, the slat is cut away and the device shown in Figs. 5 and 6 applied. This consists of a block or plate, P, secured to a plate, B, and provided with a clamp, E, a plate or block, R, also secured to the plate B, and having a clamp, E, and a plate, F, connected with plate P by a switch-lever, K, and to plate R by a safety-strip, F', held by clamping-jaws $a\ e$. The main wire, with which this device is connected, is severed and the ends inserted in the sockets or clamps E, the electrical continuity of the line being maintained through the safety-strip. The purpose of the circuit-breaking switch in this case is to interrupt the circuit permanently or only while inserting a new safety-strip, as in the other devices.

It will be seen from the description of the specific character of my invention that the same includes as features of novelty the following combinations: First, that of the grooved molding or holder, with metal plates or castings having clamps or like means extending down into the grooves for connection with the conductors therein, and provided with means for connecting them to other conductors directly or indirectly; second, that of the parts named, with a safety-strip or a circuit-breaking switch, or both.

What I therefore claim as features of novelty embraced under these combinations is—

1. The combination, with a grooved slat or holder and conductors contained therein, of junction or connection devices consisting of plates, blocks, or castings provided with clamps or means for entering the grooves and connecting with the conductors therein, and constructed for connection with other conductors, as and for the purpose set forth.

2. The combination, with a grooved slat and conductors contained therein, of metal plates, blocks, or castings adapted to be applied or attached to the slat, clamps or similar means projecting from the plates into the grooves of the slats and making contact with the conductors therein, and means for connecting the plates with each other, or with other conductors, as set forth.

3. The combination, with a grooved slat or molding and conductors contained therein, of metal plates, blocks, or castings adapted to be applied or attached to the slat, clamps or similar means projecting from the plates into the grooves and making contact with the conductors therein, and safety-strips connecting the plates together or with other conductors, as set forth.

4. The combination, with a grooved slat or molding and conductors contained therein, of metal plates, blocks, or castings adapted to be applied or attached to the face of the slat or molding, clamps or similar means projecting from the plates into the grooves, and making contact with the conductors therein, safety-strips, and switch-keys connecting the plates together or with other conductors, as set forth.

5. The combination, with a grooved slat or molding and conductors contained therein, of an insulating block or plate, metal castings having clamps projecting therefrom and attached to the insulating-block, a metal plate or plates secured to the insulating-block, safety-strips, and switch-keys for connecting the plates with each other and to the other conductors, as set forth.

6. The combination, with the grooved slat or molding and conductors contained therein, of the insulating plate or block B, the castings C D, and clamps E, projecting into the grooves and connected to the conductors therein, and devices for connecting the castings, as described.

In testimony whereof I have hereunto set my hand this 10th day of January, 1884.

EDWARD WESTON.

Witnesses:
 H. D. HARTLEY,
 W. FRISBY.